United States Patent
Talley et al.

(10) Patent No.: US 8,989,758 B1
(45) Date of Patent: Mar. 24, 2015

(54) SYSTEMS AND METHODS FOR DYNAMICALLY CONFIGURING FEMTOCELL PILOT BEACON BASED ON APPLICATION USAGE AT FEMTOCELL

(71) Applicant: Sprint Spectrum L.P., Overland Park, KS (US)

(72) Inventors: Ryan S. Talley, Overland Park, KS (US); Muralidhar Malreddy, Overland Park, KS (US); Shilpa Kowdley Srinivas, Brambleton, VA (US); Kyle C. Allen, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 173 days.

(21) Appl. No.: 13/829,782

(22) Filed: Mar. 14, 2013

(51) Int. Cl.
*H04W 72/00* (2009.01)
*H04W 72/10* (2009.01)

(52) U.S. Cl.
CPC .................................... *H04W 72/10* (2013.01)
USPC ...................................................... 455/452.1

(58) Field of Classification Search
CPC ................................................... H04W 88/08
USPC ............. 455/422.1, 436, 104, 410, 561, 41.2, 455/15; 370/329, 342, 328
See application file for complete search history.

(56) References Cited

U.S. PATENT DOCUMENTS

| | | | |
|---|---|---|---|
| 8,335,503 B1 * | 12/2012 | Desmond et al. .......... | 455/422.1 |
| 2001/0049281 A1 | 12/2001 | Duplessis et al. | |
| 2009/0098871 A1 | 4/2009 | Gogic | |
| 2009/0129336 A1 | 5/2009 | Osborn | |
| 2009/0215452 A1 | 8/2009 | Balasubramanian et al. | |
| 2009/0247170 A1 | 10/2009 | Balasubramanian et al. | |
| 2010/0048212 A1 * | 2/2010 | Yavuz et al. .................. | 455/436 |
| 2010/0210280 A1 | 8/2010 | Haynes et al. | |
| 2010/0216478 A1 | 8/2010 | Buddhikot et al. | |
| 2010/0279686 A1 | 11/2010 | Tokgoz et al. | |
| 2010/0315967 A1 | 12/2010 | Patel et al. | |
| 2010/0329132 A1 | 12/2010 | Raghothaman et al. | |

OTHER PUBLICATIONS

U.S. Appl. No. 12/400,905, filed Mar. 10, 2009, entitled "Use of Macro-Sector Channel-List Messages for Selection of Carriers for Low-Cost-Internet Base-Station Frequency-Hopping Pilot Beacons,".
U.S. Appl. No. 12/627,758, filed Nov. 30, 2009 entitled "Use of Pre-Handoff Macro-Carrier Data for Prioritization of Carriers in Femtocell Frequency-Hopping Pilot Beacons,".
Advisory Action mailed Jul. 3, 2012 for U.S. Appl. No. 12/400,905.
Notice of Allowance mailed Mar. 21, 2013 for U.S. Appl. No. 12/400,905.

(Continued)

*Primary Examiner* — Kiet Doan

(57) ABSTRACT

Methods and systems are provided for prioritizing frequencies in femtocell frequency-hopping pilot beacons. The frequency-hopping pilot beacon may prioritize transmission on particular frequencies according to usage of one or more particular applications by mobile devices served by the femtocell. The femtocell and/or femtocell control elements in the macro-network may determine that one or more particular applications are used by mobile devices served by the femtocell, identify one or more frequencies associated with the one or more frequencies, and then cause the femtocell to prioritize transmission on the identified one or more frequencies as compared to other frequencies.

14 Claims, 6 Drawing Sheets

(56) References Cited

OTHER PUBLICATIONS

Final Office Action mailed Apr. 11, 2012 for U.S. Appl. No. 12/400,905.
Non-Final Office Action mailed Sep. 28, 2011 for U.S. Appl. No. 12/400,905.
Non-Final Office Action mailed Oct. 3, 2012 for U.S. Appl. No. 12/400,905.
Notice of Allowance mailed Jun. 13, 2012 for U.S. Appl. No. 12/627,758.

* cited by examiner

SYSTEMS AND METHODS FOR DYNAMICALLY CONFIGURING FEMTOCELL PILOT BEACON BASED ON APPLICATION USAGE AT FEMTOCELL

BACKGROUND

1. Service Provider Networks (SPNs)

It is increasingly common for people to use client-side devices to communicate with other devices via cellular wireless communication systems operated by wireless-service providers (i.e., service provider networks (SPNs)), whether those devices are directly connected to the same SPN or to another system (such as another SPN or a transport network, as examples) to which that SPN directly or indirectly provides access. These client-side devices are generally referred to in this disclosure as mobile devices, though this term is intended to broadly encompass various devices known by terms such as mobile stations, access terminals, user equipment, cellphones, smartphones, wireless-communication devices, personal digital assistants (PDAs), tablets, laptops, air cards, Universal Serial Bus (USB) devices, and/or any other device(s) capable of functioning as a mobile device according to this disclosure. Via the SPN, mobile devices generally engage in communications such as voice calls, packet-data sessions, text messaging (e.g., Short Message Service (SMS) messaging), and the like.

Furthermore, the wireless communication between the SPN and a given mobile device is typically bidirectional in nature. The component of that communication that is sent from the SPN to the mobile device is described as being sent on what is known as the forward link, while the component that is sent from the mobile device to the SPN is described as being sent on what is known as the reverse link. On both links, the wireless communications are typically formatted in accordance with a wireless-communication protocol, one example type of which is code division multiple access (CDMA), where CDMA networks that operate according to industry specifications (IS) such as IS 95 and IS 2000 are often referred to as 1×RTT (or "1×") networks, where 1×RTT stands for Single Carrier Radio Transmission Technology.

Some SPNs operate in accordance with a particular type of CDMA protocol known as Evolution Data Optimized (EV DO). These SPNs are generally configured to operate according to one or more versions of IS 856, and are designed to provide high-rate packet-data service to access terminals using a technique on the forward link known as time-division multiplexing (TDM) and using what is essentially 1× technology on the reverse link. More generally, SPNs can be arranged to operate according to any of numerous other protocols, some examples of which are Long Term Evolution (LTE), Universal Mobile Telecommunications System (UMTS), WiMAX (IEEE 802.16), time division multiple access (TDMA), Global System for Mobile Communications (GSM), Wi Fi (IEEE 802.11), and the like. And certainly some SPNs are arranged to provide service in accordance with multiple protocols.

In typical SPNs, the entities with which mobile devices communicate over the air interface are known by terms such as base station and access node, terms that are used at different times in different ways to refer to different entities. For example, the term base station is sometimes used to refer simply to a device also known as a base transceiver station (BTS), which contains the hardware, antennas, and other components that cooperate to actually conduct the over-the-air communication with the mobile devices on behalf of the SPN. In LTE networks, a BTS is typically referred to as an eNodeB, which stands for Evolved Node B, named as being an evolved version of a Node B in a UMTS Terrestrial RAN (UTRAN). At times, however, the term base station or access node is used to refer in combination to (i) one or more BTSs and (ii) a device known as a base station controller (BSC) (or radio network controller (RNC)), which controls the BTS(s) and connects it (them) to the rest of the network and beyond.

The base stations for these networks are typically not associated with any subscriber or small group of subscribers in particular; rather, they are placed in publicly-accessible locations and are used by the provider's customers generally. These base stations collectively blanket large geographic areas with coverage; as such, they are referred to generally and herein as "macro-network base stations" or "macro base stations" and the network they collectively form, or to which they collectively belong, is referred to generally and herein as the "macro network."

Mobile devices and macro base stations conduct communication sessions (e.g. voice calls and data sessions) over what are known as carrier frequencies. Furthermore, macro base stations may provide service in a given coverage area on one carrier frequency, or on more than one carrier frequency. Mobile devices in the coverage area are configured to wirelessly communicate with the macro base station—and thus with the SPN—by tuning to at least one of the carrier frequencies on which the SPN provides service in the coverage area.

Procedures for initiating and managing wireless communication between macro base stations and mobile devices vary depending on the network architecture employed. Generally, coverage areas in the SPN emit pilot or reference signals to enable mobile devices to connect to such coverage areas. Mobile devices in the SPN regularly scan for such signals to identify coverage areas with which to connect, or to which to hand off. Thus, a mobile device may measure signal strengths of detected pilot signals and send a message that includes an indication of the measured signal strengths. The message may be received by a base station, and the SPN may then determine how to manage communication with the mobile device, such as whether to initiate a communication link, whether to instruct the mobile device and base stations to hand off an ongoing call, and so on. Such management determinations can be made by a centralized controller, such as an RNC in a CDMA system, or by distributed network controllers co-located with the base stations, such in an LTE system.

2. Femtocells

To address gaps in macro-network coverage (e.g., in buildings) and for other reasons, macro-network service providers may also offer devices referred to herein as femtocells. A typical femtocell may be approximately the size of a desktop phone or Wi-Fi access point, and is functionally a low-power, low-capacity version of a macro base station. A typical femtocell uses a normal power outlet, perhaps with a transformer providing a DC power supply. The femtocell may have a wired (e.g., Ethernet) or wireless (e.g. Wi-Fi) connection with the user's router, and would thus have connectivity to the Internet and/or one or more other packet-data networks. A femtocell may establish a virtual-private-network (VPN) connection over the Internet with an entity (e.g., a VPN terminator) on the macro-network provider's core network. The femtocell can then securely communicate with the VPN terminator and thereby communicate with other entities of the macro network.

A typical femtocell also has a wireless-communication interface configured to wirelessly communicate with mobile devices according to wireless protocols such as CDMA, LTE, and the like. The femtocell may act as a micro base station to provide local wireless coverage on the macro-network provider's network via the user's Internet connection. Typically, a femtocell will provide service on a single carrier frequency (or on a single carrier frequency per technology, where multiple technologies, such as CDMA and EV-DO, are supported). The femtocell will typically also transmit a pilot beacon, which includes administrative messages and parameters that mobile devices can use to connect with the femtocell. The pilot beacon may include information to facilitate a handoff of a mobile device from a macro base station to the femtocell. To inform mobile devices of the femtocell, the pilot beacon may be transmitted on one or more of the macro-network carrier frequencies on which the SPN provides service in that area.

OVERVIEW

As noted above, femtocells are designed to have low transmission-power capabilities, and consequently to provide coverage areas that are relatively limited in comparison with those of typical macro base stations. As examples, a typical femtocell may be designed to provide a coverage area that is the size of a dorm room, an apartment, a house, and so on. And along with limited transmission power, femtocells are also designed to have a relatively low capacity for serving mobile stations. For example, a femtocell may provide service on a single carrier frequency and have the capacity (e.g., channel elements) to provide service to up to five mobile devices at any given time, though any suitable number of channel elements (and/or femtocell carrier frequencies) may be used in a given implementation.

As described, femtocells typically emit a pilot beacon that includes administrative messages and parameters that mobile devices can use to facilitate handoffs from the macro network to the femtocell's carrier frequency. Thus, among the purposes of the femtocell's pilot beacon is to advertise the femtocell's carrier frequency in the femtocell's coverage area, such that mobile devices can opt to tune to that carrier frequency and communicate via the femtocell. As such, the femtocell transmits its pilot beacon on the one or more macro-network carriers in the surrounding area.

In particular, and typically after an initial auto-configuration process, a femtocell will transmit either what is known as and referred to herein as a "fixed" pilot beacon, or what is known as and referred to herein as a "frequency-hopping" pilot beacon. If the one or more macro base stations in the surrounding area all provide service on the same macro-network carrier frequency, the femtocell will transmit its pilot beacon on only that macro-network carrier frequency (i.e., a fixed pilot beacon). If, however, service is provided on multiple macro-network carrier frequencies by the surrounding macro network, the femtocell will cycle through those carrier frequencies, transmitting its pilot beacon on each macro-network carrier frequency for (typically) a fixed period of time (i.e., a frequency-hopping pilot beacon), such as a few hundred milliseconds or one or two seconds.

In the case of a frequency-hopping pilot beacon, the femtocell will typically transmit its pilot-beacon information on each macro-network carrier frequency in a set of macro-network carrier frequencies for a fixed amount of time, and then repeat. Thus, the overall cycle takes a finite amount of time, and the femtocell typically needs to spend some minimum amount of time on each carrier frequency. Taken together, this limits the total number of carriers on which the femtocell can transmit its pilot-beacon information each cycle to some upper-bound number of carrier frequencies. However, the total number of macro-network carrier frequencies on which service is provided by the surrounding macro network may exceed this upper bound. As such, the femtocell's pilot beacon may not hop to some macro-network carrier frequencies, which may cause mobile stations operating on those carrier frequencies to not be aware of the femtocell. And even if the femtocell frequency-hopping pilot beacon can and does hop on every macro-network carrier frequency on which service is provided in the surrounding area, mobile devices that are operating on macro-network carrier frequencies that are later in the repeated sequence may on average have to wait longer before being informed of the presence of the femtocell.

As such, to address these and other drawbacks of prior implementations, presently disclosed are systems and methods for dynamically configuring a femtocell pilot beacon based on application usage at the femtocell. In accordance with the present disclosure, a femtocell prioritizes certain macro-network carrier frequencies in its frequency-hopping pilot beacon. In particular, the femtocell prioritizes macro-network carrier frequencies based on application usage by mobile devices served by the femtocell in order to decrease hand off time for such mobile devices.

In various different embodiments, the femtocell may prioritize a particular frequency by, for example, transmitting a frequency-hopping pilot beacon that hops on the particular frequency more often than on another frequency in at least one cycle of the frequency-hopping pilot beacon. Additionally or alternatively, the femtocell may prioritize the particular frequency by, for example, transmitting the frequency-hopping pilot beacon on the particular frequency for a longer cumulative duration as compared to one or more shorter cumulative durations during which the femtocell transmits the frequency-hopping pilot beacon on another frequency. Additionally or alternatively, the femtocell may prioritize the particular frequency by, for example, transmitting the frequency-hopping pilot beacon on the particular frequency at a greater transmission power as compared to transmission powers at which the femtocell transmits the frequency-hopping pilot beacon on another frequency. And certainly other manners of prioritizing could be used.

In some embodiments, the femtocell may prioritize transmission of its frequency-hopping pilot beacon on particular macro-network carrier frequencies according to the application usage by mobile devices served by the femtocell. For example, the femtocell and/or femtocell-control elements in the macro-network may determine that one or more particular applications are used by mobile devices served by the femtocell, identify one or more frequencies associated with the one or more frequencies, and then cause the femtocell to prioritize transmission on the identified one or more frequencies as compared to other frequencies. In some embodiments, the femtocell and/or femtocell control elements in the macro-network may additionally or alternatively select a pilot beacon transmission pattern that prioritizes transmission on the macro-network carriers according to a quantity of mobile devices served by the femtocell that use one or more particular applications, and then cause the femtocell to transmit the frequency hopping pilot beacon according to the selected pilot beacon transmission pattern.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

1. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

2. Example Architecture

A. Example Communication System

Figure 1:
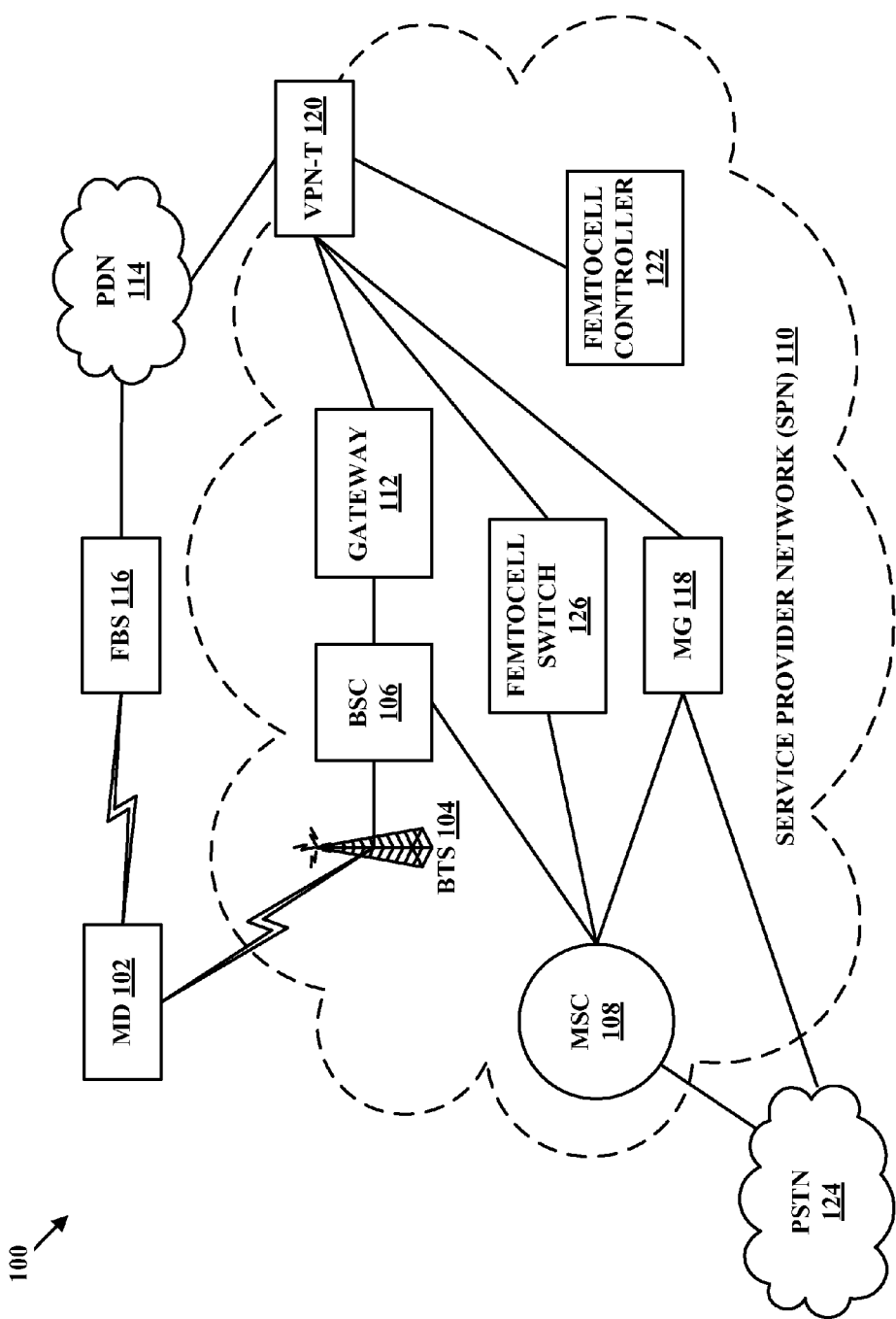
FIG. 1 depicts an example communication system.

Referring now to the drawings, FIG. 1 is a simplified block diagram of an example cellular wireless communication system 100. For purposes of explanation and example only, the wireless communication system 100 shown in FIG. 1 is generally arranged and described according to CDMA system architecture. It should be understood, however, that an LTE system architecture could be used instead or in addition, as could an architecture according to one or more other protocols mentioned herein and/or any others now known or later developed.

As shown in FIG. 1, a communication system 100 includes a mobile device (MD) 102, a macro BTS 104, a BSC 106, a mobile switching center (MSC) 108, an SPN 110, a gateway 112, a packet-data network (PDN) 114, femtocell (or femto base station (FBS)) 116, a media gateway 118, a VPN terminator (VPN-T) 120, a femtocell controller 122, a public switched telephone network (PSTN) 124, and a femtocell switch 126. And additional entities could be present as well, such as additional mobile devices in communication with BTS 104, additional entities in communication with PDN 114 and/or PSTN 124, etc. Also, there could be one or more devices and/or networks making up at least part of one or more communication links. For example, there could be one or more routers, cable modems, and/or other devices or networks on the link between femtocell 116 and PDN 114. Mobile station 102 is described more fully in connection with FIG. 2, while FBS 116 is described more fully in connection with FIG. 3.

Service-provider network 110 may encompass all of the network elements depicted in FIG. 1 as being included in its dashed-cloud shape. In general, there may be more and/or different communication links among entities within SPN 110, and there may be more and/or different connections between SPN 110 and outside entities. Furthermore, there may be a core packet network (not depicted) making up part of SPN 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

Gateway 112 may act as a network access server between (a) PDN 114 and (b)(i) BSCs such as BSC 106 and (ii) VPN terminators such as VPN terminator 120, facilitating packet-data communication by mobile stations on PDN 114, which may be the well-known global packet-data network generally referred to as the Internet, but could also be or include one or more other packet-data networks. PDN 114 may include one or more wide area networks, one or more local area networks, one or more public networks, one or more private networks, one or more wired networks, one or more wireless networks, and/or one or more networks of any other type. Devices in communication with PDN 114 may exchange data using a packet-switched protocol such as the Internet Protocol (IP), and may be identified by an address such as an IP address.

MG 118 may be arranged to (a) receive packet-based communications from entities on SPN 110, convert those to circuit-switched communications, and pass them to MSC 108 and/or PSTN 124 and (b) receive circuit-switched communications from MSC 108 and/or PSTN 124, convert those to packet-based communications, and pass them to entities on SPN 110.

VPN terminator 120 may be arranged to establish secure VPN connections over PDN 114 with femtocells such as femtocell 116, enabling the femtocells to securely communicate with devices on SPN 110 and beyond. Femtocell controller 122 may be arranged to communicate via VPN terminator 120 with femtocells such as femtocell 116, perhaps to receive requests from various femtocells for configuration data, and to accordingly select various operational parameters for femtocells (e.g. carrier frequency, PN offset, whether to broadcast a pilot beacon, contents of any pilot beacon to be broadcast, transmission-power level), and to transmit those parameters to femtocells, perhaps along with other configuration data and messaging. Femtocell switch 126 may be arranged to act as a switch between MSC 108 and VPN terminator 120, enabling mobile devices communicating via femtocells to engage in calls over PSTN 124 via MSC 108. And certainly many other configurations are possible, as the described configuration is provided by way of example and not limitation.

B. Example Mobile Device

Figure 2:
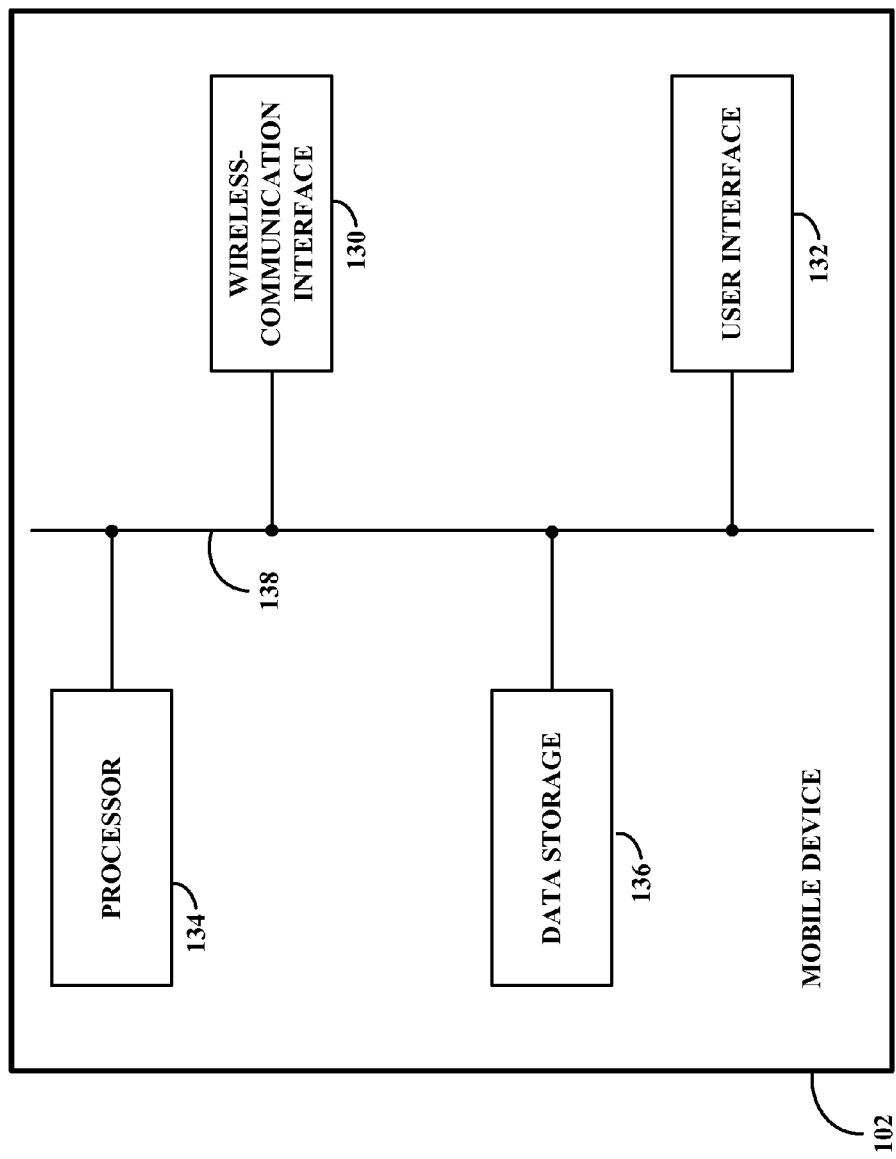
FIG. 2 depicts an example mobile device.

FIG. 2 depicts mobile device 102 as including a wireless-communication interface 130, a user interface 132, a processor 134, and data storage 136, all of which may be coupled together by a system bus, network, or other communication mechanism 138.

Wireless-communication interface 130 may comprise one or more antennae and one or more chipsets for communicating with one or more base stations over respective air interfaces. As an example, one such chip set could be suited for LTE communication. As another example, one such chipset could be suited for CDMA communication. Wireless-communication interface 130 may also or instead be arranged to communicate according to one or more other types of wireless communication (e.g., protocols) mentioned herein and/or any others now known or later developed. User interface 132 may include one or more input devices such as a touchscreen, one or more buttons, a microphone, and the like for receiving inputs from users, as well as one or more output devices such as a display, one or more indicator lights, a speaker, and the like for communicating outputs to users.

Processor 134 may comprise one or more general-purpose processors and/or one or more special-purpose processors, and may be integrated in whole or in part with wireless-communication interface 130. Data storage 136 may comprise one or more volatile and/or non-volatile storage components (such as magnetic, optical, flash, or other non-transitory storage), and may be integrated in whole or in part with processor 134. And certainly other configurations are possible. Data storage 136 may contain program instructions executable by processor 134 for carrying out various mobile-device functions described herein.

C. Example Femtocell

Figure 3:
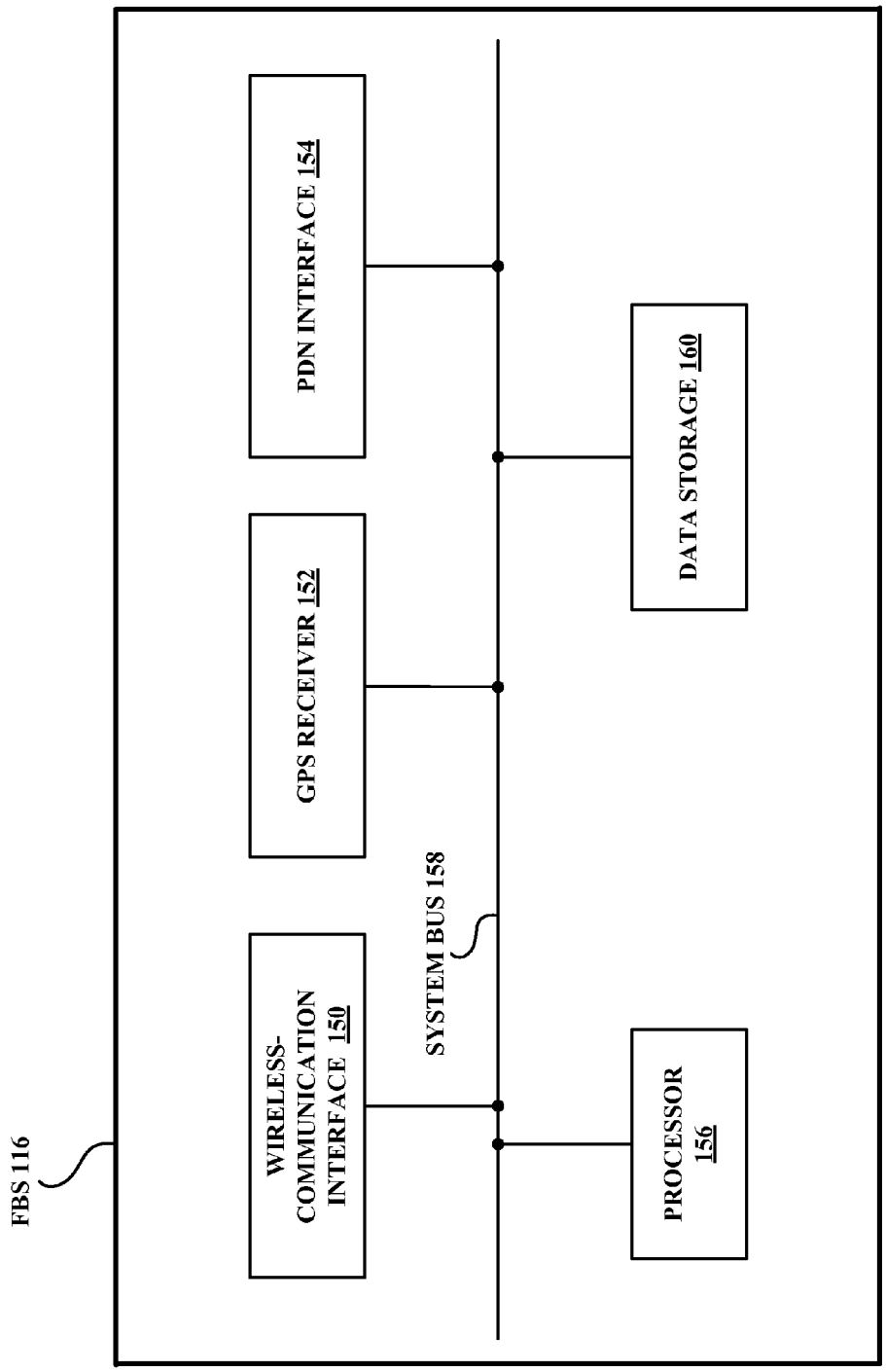
FIG. 3 depicts an example femtocell base station.

FIG. 3 depicts an exemplary diagram of femtocell (or femto base station (FBS)) 116, which includes a wireless-communication interface 150, a GPS receiver 152, a PDN interface 154, a processor 156, and data storage 160, all of which may be coupled together by a system bus, network, or other communication mechanism 158. Note that femtocell 116 could have additional and/or different components, and that this structure is provided by way of example.

Wireless-communication interface 150 may include one or more antennas, one or more chip sets, a set of one or more channel elements, and/or one or more other components suitable for providing a wireless coverage according to a wireless-communication protocol such as CDMA or LTE (and/or one or more other technologies). GPS receiver 152 may be any known or hereafter-developed GPS receiver, suitable for receiving and decoding GPS signals for location and timing purposes, perhaps among other purposes. In some embodiments, a femtocell may have a location module in addition to or instead of a GPS receiver.

PDN interface 154 may provide a (e.g., wired) packet-data interface for communicating with a device such as a router or cable modem, and in general for communicating over one or more packet-data networks such as PDN 114. Processor 156 may comprise multiple (e.g., parallel) processors, such as a general purpose microprocessor and/or a discrete digital signal processor. The data storage 160 may take various forms, in one or more parts, such as a non-volatile storage block and/or a removable storage medium, and may contain program instructions executable by processor 156 for carrying out the femtocell functions described herein, as well as any other operational, configuration, and/or other type of data deemed suitable in a given femtocell implementation.

3. Example Operation

Mobile devices in communication with SPN 110 may be configured to scan the macro-network carrier frequencies used by SPN 110, in order to identify coverage areas to which the mobile devices can connect. The femtocell 116 transmitting the frequency-hopping pilot beacon on the frequencies used as macro-network carriers allows mobile devices in range of the femtocell 116 to detect the frequency-hopping pilot beacon in the course of typical scanning operations.

In some arrangements, the femtocell 116 can be configured to identify carrier frequencies used in one or more coverage areas of the SPN 110 that are near the location of the femtocell 116. The femtocell 116 may do so by using geographic location information derived from the GPS receiver 152 (or other location information, such as indicated by a Wi-Fi access point, router, cable modem, and/or the like) and then communicating with the femtocell controller 122 to identify frequencies used as macro-network carriers in coverage areas of the SPN 110 located near the femtocell 116. The frequency-hopping pilot beacon can then be transmitted to hop on one or more of the identified frequencies.

As described above and as further described in the examples explained below, the femtocell 116 can be further configured to prioritize transmission of its frequency-hopping pilot beacon on particular ones of those macro-network carriers, relative to others. Prioritizing particular frequencies allows the femtocell 116 to more readily attract mobile devices operating on the prioritized frequencies.

Furthermore, prioritization can take different forms. For example, the frequency-hopping pilot beacon may be transmitted on only particular frequencies identified for prioritization. Additionally or alternatively, the frequency-hopping pilot beacon may be transmitted more often, with greater cumulative duration, and/or with greater power on particular frequencies identified for prioritization. And certainly other manners of prioritization could be used as well.

In general, and as used herein, the functional components that operate to prioritize particular frequencies in the frequency-hopping pilot beacon may be referred to herein as a femtocell system. The femtocell system may operate to dynamically identify particular frequencies for prioritization, select a suitable hopping pattern that prioritizes the particular frequencies, and then transmit the frequency-hopping pilot beacon according to the selected pattern. The femtocell system may include the femtocell 116 (e.g., via the processor 156 executing programming logic 162) and/or network elements in the SPN 110, such as the femtocell controller 122, which operate alone or in combination to provide the functions described herein.

Example methods for identifying frequencies for prioritization according to macro-network loading conditions are described in connection with FIGS. 4A-4C.

A. First Example Process

Figure 4A:
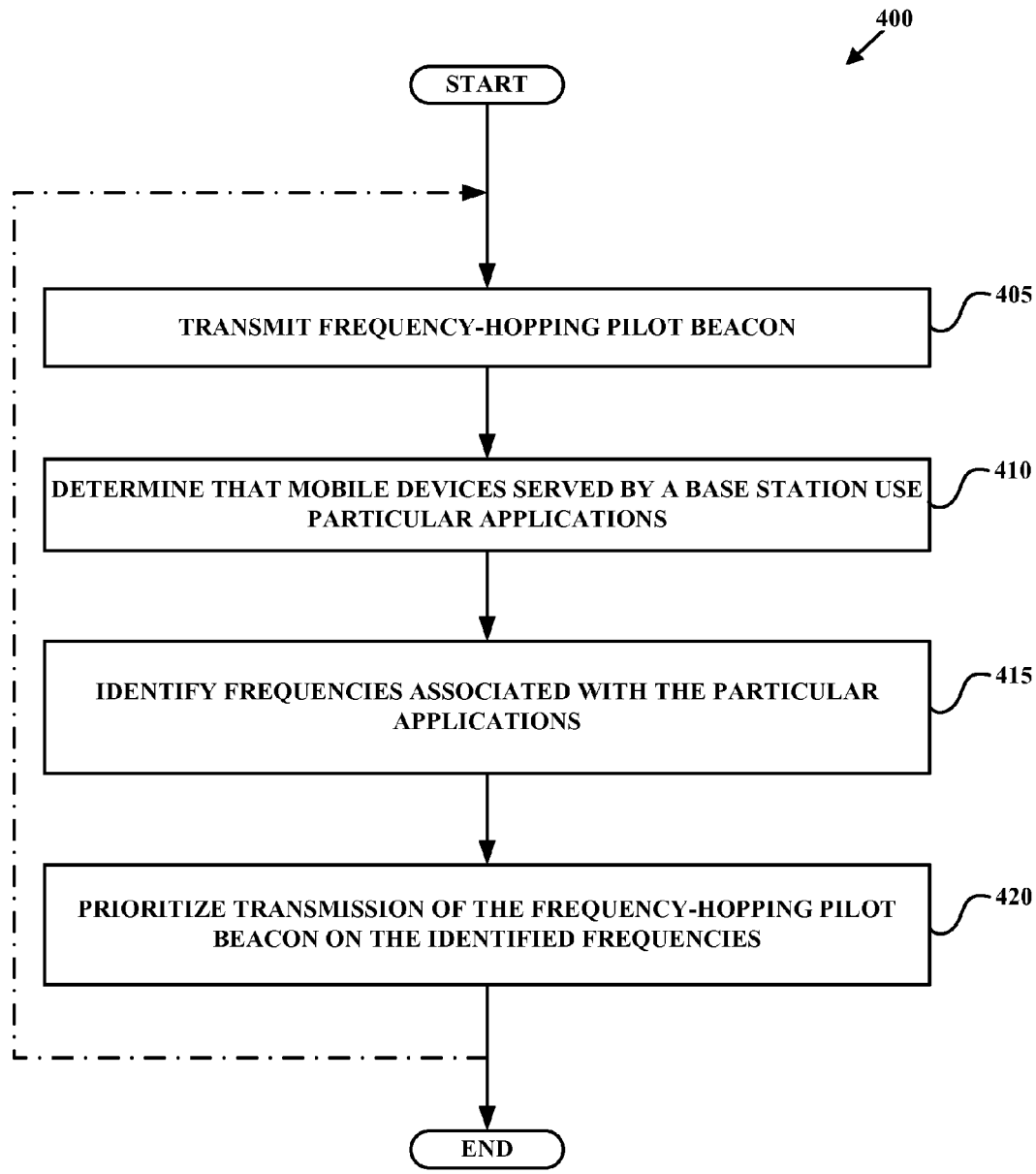
FIG. 4A depicts functions carried out in accordance with at least one embodiment.

FIG. 4A is a flowchart of a process 400 that can be carried out by a wireless network system, such as the femtocell system described in connection with the communication system 100 of FIG. 1. In particular, FIG. 4A depicts a process 400 for a femtocell system to determine that one or more mobile devices served by the femtocell 116 use one or more particular applications, identify one or more of the frequencies based on the frequencies being associated with the particular applications, and prioritize transmissions of its frequency-hopping pilot beacon on the identified frequencies. The process 400 thereby causes the femtocell 116 to prioritize transmission according to the application usage of mobile devices served by the femtocell 116.

In some embodiments, the particular application (or applications) causes the mobile device 102 to wirelessly communicate in a manner that is preferentially served by particular frequencies and/or by wireless protocols available preferentially on particular frequencies. For instance, the particular application may be a packet-based low latency voice service that is preferentially communicated over a low-latency channel for sending/receiving packet data (e.g., an EV-DO channel) rather than one preferred for conveying voice communication over the PSTN 124. Thus, upon determining that mobile devices served by the femtocell 116 use the particular application, the femtocell system may prioritize certain frequencies in its frequency-hopping pilot beacon to preferentially attract mobile devices operating on such frequencies. The femtocell system can thereby decrease lag time in establishing, or re-establishing, connections between such mobile devices and the femtocell 116 during handoff.

As shown in FIG. 4A, the process 400 begins at block 405, when femtocell 116 transmits a frequency-hopping pilot beacon among a plurality of frequencies. At block 410, the femtocell system determines that one or more mobile devices served by femtocell 116 use one or more particular applications. At block 415, the femtocell system identifies one or more of the frequencies based on the one or more frequencies being associated with the one or more particular applications. At block 420, the femtocell system prioritizes transmission of the frequency-hopping pilot beacon on the one or more frequencies identified in block 415 as compared to others. The steps are more fully explained below.

i. Transmit a Frequency-Hopping Pilot Beacon

At block 405, femtocell 116 begins transmitting a frequency-hopping pilot beacon among a plurality of frequencies. The frequency-hopping pilot beacon transmitted by the femtocell 116 repeatedly cycling through transmitting pilot-beacon information on each frequency in a group of frequencies. The femtocell system can cause the pilot beacon to cyclically hop among multiple macro-network carriers for coverage areas of the SPN 110 in the vicinity of the femtocell 116. For example, the frequency-hopping pilot beacon can be transmitted on macro-network carriers that are retrieved, for example, from a licensee database maintained by the FCC based on a current location of the femtocell 116. Alternatively, a group of frequencies could be retrieved from a cell site database (not shown) accessible by the femtocell controller 122 within the SPN 110. Other methods could also be used to identify a group of frequencies on which to transmit the frequency-hopping pilot beacon, including methods that are automatically undertaken upon startup of the femtocell 116 as part of an auto-configuration routine.

Mobile devices 102 served by a macro-network carrier may detect the frequency-hopping pilot beacon and send a request to the femtocell 116 and/or SPN 110 to handoff from their current coverage area to the femtocell's coverage area. Such a request may be generated by the mobile device 102 for any number of reasons, including a reduction in signal strength of the mobile device's current serving signal, for example. To facilitate this detection process, the mobile device 102 may monitor signal conditions (e.g., carrier-to-interference (C/I) ratio and/or a signal-to-interference-plus-noise ratio (SINR)) on a plurality of macro-network carriers to detect pilot signals and/or pilot beacons from a combination of macro-network coverage areas and/or femtocell coverage areas. The mobile device 102 may then select, request, and receive service in the coverage area with the best signal conditions (i.e., the "strongest" coverage area) and/or based on one or more other criteria deemed suitable in a given implementation.

ii. Determine that Mobile Devices Served by the Femtocell Use Particular Applications At block 410, the femtocell system determines that one or more mobile devices served by the femtocell 116 use one or more particular applications. The femtocell system can determine whether mobile devices served by the femtocell 116 use the particular application by querying the mobile devices served by the femtocell 116 and/or by retrieving such information from a database accessible to the femtocell system. The femtocell system may, for example, include a database that includes a listing of mobile devices served by the femtocell 116 which indicates whether the mobile devices use the one or more particular applications.

The particular applications may be, for example, software applications stored on the mobile device 102 that, when executed by the mobile device 102, cause the mobile device 102 to carry out certain functions. The particular application may cause the mobile device 102 to send/receive packet data with other mobile devices also using the particular application. The particular application may cause the mobile device 102 to wirelessly communicate in a manner that is preferentially served by particular RF channels and/or by wireless protocols available preferentially on particular RF channels. For example, the particular application may be a time sensitive application, such as a low latency voice service. Thus, the application may cause the mobile device 102 to communicate voice information as data packets, such as an application that uses Voice-Over-Internet Protocol (VOIP) communication protocols and/or methodologies to send/receive voice information as packets of data. The application may, for example, operate to according to the QChat protocol developed by Qualcomm Information Systems. The particular applications may also include other time sensitive applications which cause the mobile device to communicate in a manner that is handled over particular RF channels. In some examples, the application may be a push-to-talk application.

The mobile devices served by the femtocell 116 can include mobile devices presently in the coverage area of the femtocell 116 and configured to wirelessly communicate with the femtocell 116 on the femtocell's RF carrier. Additionally or alternatively, the mobile devices served by the femtocell 116 can include mobile devices that have, at some time in their history, been included in the coverage area of the femtocell 116. Additionally or alternatively, the mobile devices served by the femtocell 116 can include mobile devices included on a list of devices registered to communicate with the femtocell 116. For example, the femtocell 116 may be a private base station that is configured to only provide service to devices included on a "white list," which may identify particular approved mobile devices by a substantially unique identifier, such as by mobile directory number (MDN), to authenticate such mobile devices.

The femtocell system may track application usage of mobile devices served by the femtocell 116. The femtocell system may, for example, monitor which mobile devices served by the femtocell 116 use the particular applications and/or which mobile devices have the particular applications installed. In some examples such information can be monitored and/or logged by entities in the SPN 110, such as the femtocell controller 122 alone or in combination with other network control components such as a radio network controller (RNC) and/or a mobility management entity (MME). In some examples, such information (or subsets thereof) can additionally or alternatively be monitored and/or logged by the femtocell 116.

Furthermore, some examples may include retrieving information from both the femtocell 116 and the SPN 110 and determining that mobile devices use the one or more particular applications by combining such information. For example, a list of mobile devices served by the femtocell 116 may be provided by the femtocell 116. A list of mobile devices on which one of the particular applications is presently operating and/or is installed may be provided by the SPN 110. The subset of mobile devices that are both served by the femtocell 116, and use the one or more particular applications, if there are any, can thus be identified by cross-referencing the two lists. To determine the application usage of mobile devices served by the femtocell 116, the femtocell 116 may thus communicate with the SPN 110. And numerous other ways of determining application usage at the femtocell 116 may be used instead or in addition, as known to those of skill in the art.

iii. Identify Frequencies Associated with the Particular Applications

At block 415, the femtocell system identifies one or more of the frequencies based on the identified one or more frequencies being associated with the one or more particular applications. For example, RF channels can be identified that provide service suitable for operation of the particular applications.

For example, when the particular applications provide VOIP service, the applications may communicate according to protocols and/or methodologies configured for communication of packet data with low latency, such as according to the evolved data only (EV-DO) standard. Thus, the femtocell system may identify frequencies that provide service on EV-DO channels.

In some examples, the frequencies that are identified in block 415 are associated with the particular application(s) according to correlation data. Such correlation data may be stored by the femtocell system (e.g., in a memory accessible to the femtocell 116 and/or the femtocell controller 122). Thus, identifying the particular frequencies may include referring to such correlation data to identify one or more frequencies which the correlation data associates with the particular application(s).

iv. Prioritize Transmission of the Frequency-Hopping Pilot Beacon on the Identified Frequencies At block 420, the femtocell system prioritizes transmission of the frequency-hopping pilot beacon on the particular one of the frequencies as compared to the other one. Once the femtocell system has determined the particular frequency (or frequencies) that are more heavily loaded than others, the femtocell 116 may use that information in subsequent cycles of its frequency-hopping pilot beacon to prioritize the particular frequency (or frequencies) as compared to others.

The femtocell 116 may prioritize a particular frequency by transmitting the frequency-hopping pilot beacon on the particular frequency more often than others in at least one subsequent cycle of the frequency-hopping pilot beacon. In an example in which the frequency-hopping pilot beacon is transmitted in a cyclic pattern, the femtocell 116 may transmit (hop) on the particular frequency more than once during a given cycle in which the femtocell transmits (hops) on the other frequencies only once. Additionally or alternatively, in a given cycle of the frequency-hopping pilot beacon, the femtocell 116 may transmit on the particular frequency for a longer continuous duration as compared to shorter continuous durations in which the femtocell 116 transmits on another frequency. Additionally or alternatively, in a given cycle of the frequency-hopping pilot beacon, the femtocell 116 may transmit on the first carrier for a longer cumulative duration as compared to shorter cumulative durations in which the femtocell 116 transmits on another frequency. Additionally or alternatively, in a given cycle of the frequency-hopping pilot beacon, the femtocell 116 may transmit on the particular frequency with a relatively greater transmission power than a transmission power with which the femtocell 116 transmits on another frequency.

For example, the femtocell 116 may transmit its frequency-hopping pilot beacon on one or more of five different frequencies F1, F2, F3, F4, and F5. Without prioritizing carriers, the femtocell 116 may cycle through frequencies F1-F5, transmitting its pilot beacon on each of those frequencies for a fixed period of time (i.e., a conventional frequency-hopping pilot beacon), such as for a few hundred milliseconds or one to four seconds, before cycling back to the beginning of the list. However, according to some embodiments disclosed herein, the femtocell 116 and/or SPN 110 may cause the femtocell 116 to prioritize transmission of a particular one of the frequencies F1-F5 based on the application usage of mobile devices served by femtocell 116. For example, the femtocell 116 and/or SPN 110 may determine that the frequency F1 is associated with particular application(s) used by at least one mobile device served by the femtocell 116 (e.g., in blocks 410-415). For instance, the frequency F1 may be identified as an RF channel associated with the particular application(s) used by at least one mobile device served by the femtocell 116. The femtocell 116 can then prioritize transmission on F1 relative to the other frequencies F2-F5 during subsequent transmissions of the frequency-hopping pilot beacon.

Upon prioritizing the carrier F1, the femtocell 116 may transmit its frequency-hopping pilot beacon on carrier F1 more often than another frequency, during a given cycle. For example, the femtocell 116 may transmit its pilot beacon in the following order: F1→F2→F3→F1→F4, before repeating the cycle again. In the next cycle, the femtocell 116 may transmit on the same frequencies again, or may include other remaining carriers. For example, in the next cycle, the femtocell 116 may transmit its pilot beacon in the following order: F1→F2→F3→F1→F5.

By transmitting on the higher priority frequency more often in a given cycle, the femtocell 116 is more likely to be transmitting its pilot beacon to a mobile device 102 in the region during its respective slot cycle, in which the mobile device 102 scans for coverage areas to connect with. In subsequent cycles of the frequency-hopping pilot beacon, the order of frequencies may be switched in order to allow for mobile stations 102 having varying slot cycles an opportunity to receive the frequency-hopping pilot beacon. For example, a subsequent cycle in which frequency F1 is still prioritized may take the form of: F2→F3→F1→F5→F1, before repeating the cycle again. In other embodiments, the femtocell 116 may not be limited to five frequencies, and more or less than five frequencies could be used in each cycle. Additionally or alternatively, the femtocell 116 may prioritize more than one frequency at a time. For example, the femtocell may prioritize both carriers F1 and F2 by transmitting its pilot beacon in the following manner: F1→F2→F3→F1→F2, before repeating the cycle again. Other orders could also be used.

Additionally or alternatively, the femtocell 116 may prioritize the carrier F1 by transmitting its frequency-hopping pilot beacon on carrier F1 for a longer continuous duration as compared to a continuous duration in which the femtocell 116 transmits on one or more of the other frequencies F2-F5. For example, the femtocell 116 may transmit its pilot beacon in the following order and for the following times: F1 (3.84 s)→F2 (2 s)→F3 (2 s)→F4 (2 s)→F5 (2 s), before repeating the cycle. Similar to the above, in subsequent cycles of the frequency-hopping pilot beacon, the order of frequencies may be switched in order to allow for mobile devices having varying slot cycles an opportunity to receive the pilot beacon. For example, a subsequent cycle in which carrier F1 is still prioritized may take the form of: F2 (2 s)→F3 (2 s)→F4 (2 s)→F1 (3.84 s)→F5 (2 s), before repeating the cycle again. Additionally or alternatively, the femtocell 116 may prioritize more than one carrier at a time. For example, the femtocell 116 may prioritize both carriers F1 and F2 by broadcasting its pilot beacon in the following manner: F1 (3.84 s)→F2 (3.84 s)→F3 (1.4 s)→F4 (1.4 s)→F5 (1.4 s).

Additionally or alternatively, the femtocell 116 may prioritize the frequency F1 by transmitting on the frequency F1 for a greater cumulative duration as compared to a cumulative duration in which the femtocell 116 transmits on another one of the frequencies F2-F5. For example, the femtocell 116 may transmit its pilot beacon in the following order and for the following times: F1 (1.4 s)→F2 (2 s)→F1 (1.4 s)→F3 (2 s)→F1 (1.4 s)→F4 (2 s)→F1 (1.4 s)→F5 (2 s), before repeating the cycle. Similar to the above, in subsequent cycles of the frequency-hopping pilot beacon, the order of frequencies may be switched in order to allow for mobile devices having varying slot cycles an opportunity to receive the pilot beacon, and moreover the femtocell 116 may prioritize more than frequency at a time.

Additionally or alternatively, the femtocell 116 may prioritize the frequency F1 by transmitting on the frequency F1 with a transmission power $P_{high}$ greater than a transmission power $P_{low}$ with which the femtocell 116 transmits on one or more of the other frequencies F2-F5. For example, the femtocell 116 may transmit its pilot beacon in the following order and at the following transmission powers: F1 ($P_{high}$)→F2 ($P_{low}$)→F3 ($P_{low}$)→F4 ($P_{low}$)→F5 ($P_{low}$), before repeating the cycle. Similar to the above, in subsequent cycles of the frequency-hopping pilot beacon, the order of frequencies may be switched in order to allow for mobile devices having varying slot cycles an opportunity to receive the pilot beacon, and moreover the femtocell may prioritize more than frequency at a time.

Other possibilities exist for prioritizing frequencies, including combinations of the above techniques for prioritizing one or more of the frequencies relative to others, which were described separately for convenience in explanation only. For example, the femtocell may prioritize transmission by selecting a hopping pattern that prioritizes one or more frequencies by providing a combination of number of hops per cycle, cumulative and/or continuous transmission durations, and/or transmission power for one or more prioritized frequencies that results in the pilot beacon being more readily detectable at the one or more prioritized frequencies than at the other frequencies.

Prioritizing the identified frequencies allows mobile devices operating on such frequencies to detect the femtocell 116 faster and/or from a greater range, and thereby decrease the lag time for the mobile device 102 to hand off connection to the femtocell 116. For mobile devices operating time sensitive applications, such as applications providing low latency VOIP-based services, decreasing the hand off delay time affects the time before the mobile device 102 is ready to make and receive calls while connected through the femtocell 116. Decreasing such hand off lag time improves network performance metrics for mobile devices using the particular applications, and correspondingly increases performance of such mobile devices 102.

The femtocell 116 can thus assist the SPN 110 in handling network traffic by decreasing handoff lag time for mobile devices using particular applications, such as low latency VOIP-based services and other time sensitive applications.

B. Second Example Process

Figure 4B:
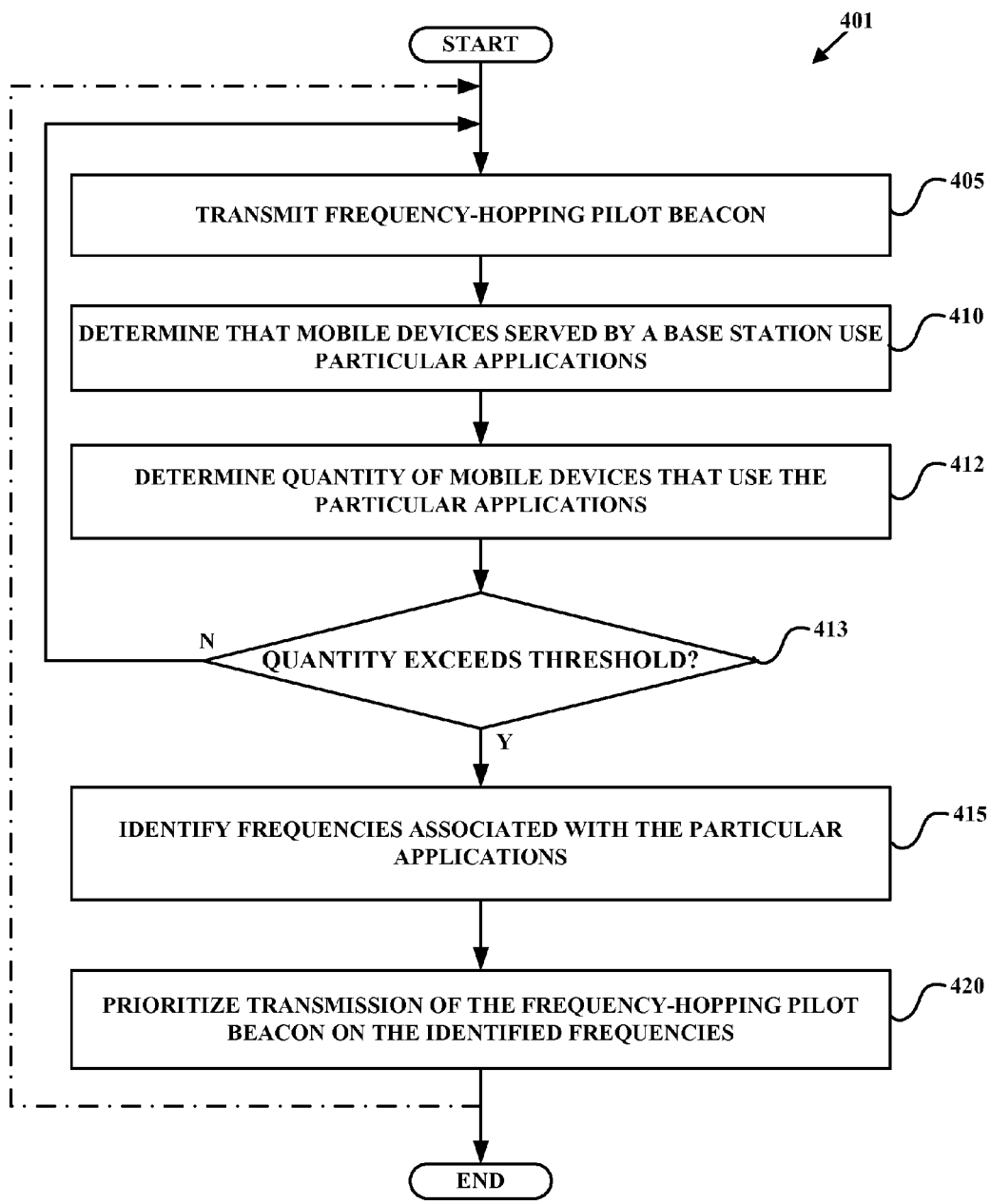
FIG. 4B depicts functions carried out in accordance with at least one embodiment.

FIG. 4B is a flowchart of another example process 401 according to an example embodiment. In the process 401, the femtocell system (e.g., the femtocell 116 and/or SPN 110) operate according to blocks 405, 410, but before carrying out block 415 to identify one or more frequencies and block 420 to prioritize such frequencies, the identified frequencies are compared with a threshold level, at block 412. If the quantity of mobile devices using the particular applications (or the quantity of usage of such applications) does not exceed the threshold level, the process 401 returns to block 405 to continue transmitting without adjusting the prioritization of the frequency-hopping pilot beacon. If the quantity does exceed the threshold level, the process 401 continues to blocks 415 and 420 to adjust the prioritization of the frequency-hopping pilot beacon so as to prioritize the frequencies identified in block 415.

At block 412, the femtocell system determines a quantity of mobile devices served by the femtocell 116 that use the one or more particular applications. In some embodiments, the quantity of mobile devices using the applications (or the quantity of usage of such applications) can be determined according to the then-current indication(s) of application usage (e.g., according to the most recent update of such information). The quantity may also be determined according to more than one indication(s) of application usage, including some that are not the most current, such as an example that estimates application usage according to a running median or average of the most recent N updates of application usage information, where N is greater than one.

In some embodiments, determining the application usage of mobile devices served by the femtocell 116 may include determining the quantity (e.g., number or percentage) of the mobile devices which use the particular applications at a given time or over a given duration. In some examples, the quantity can be a number of mobile devices or a quantity of activity using the particular applications (e.g., number of VOIP calls, cumulative duration of VOIP calls) at a given time or over a given duration.

The threshold level in block 413 can be specified as an absolute threshold level (e.g., an absolute number of mobile devices, number of active applications presently or over time, and/or amount of data transmitted via such applications) and/or a relative threshold level (e.g., a percentage of mobile devices using the application, a percentage of mobile devices actively using the application presently or over time, and/or a percentage of femtocell data conveyed via such applications). Moreover, the threshold level can be dynamically adjusted according to application usage. Thus, the threshold in block 413 may be set to specify that frequencies are only prioritized in block 420 if the application usage by mobile devices served by the femtocell 116 is at least beyond a threshold capacity (e.g., exceeding a percentage of available bandwidth at the femtocell 116 and/or exceeding a percentage of calls engaged in through the femtocell 116). Moreover, the threshold specified by block 412 may be adjusted or even turned off (i.e., set to zero) on a dynamic basis by the femtocell system according to, for example, overall traffic on the SPN 110.

C. Third Example Process

Figure 4C:
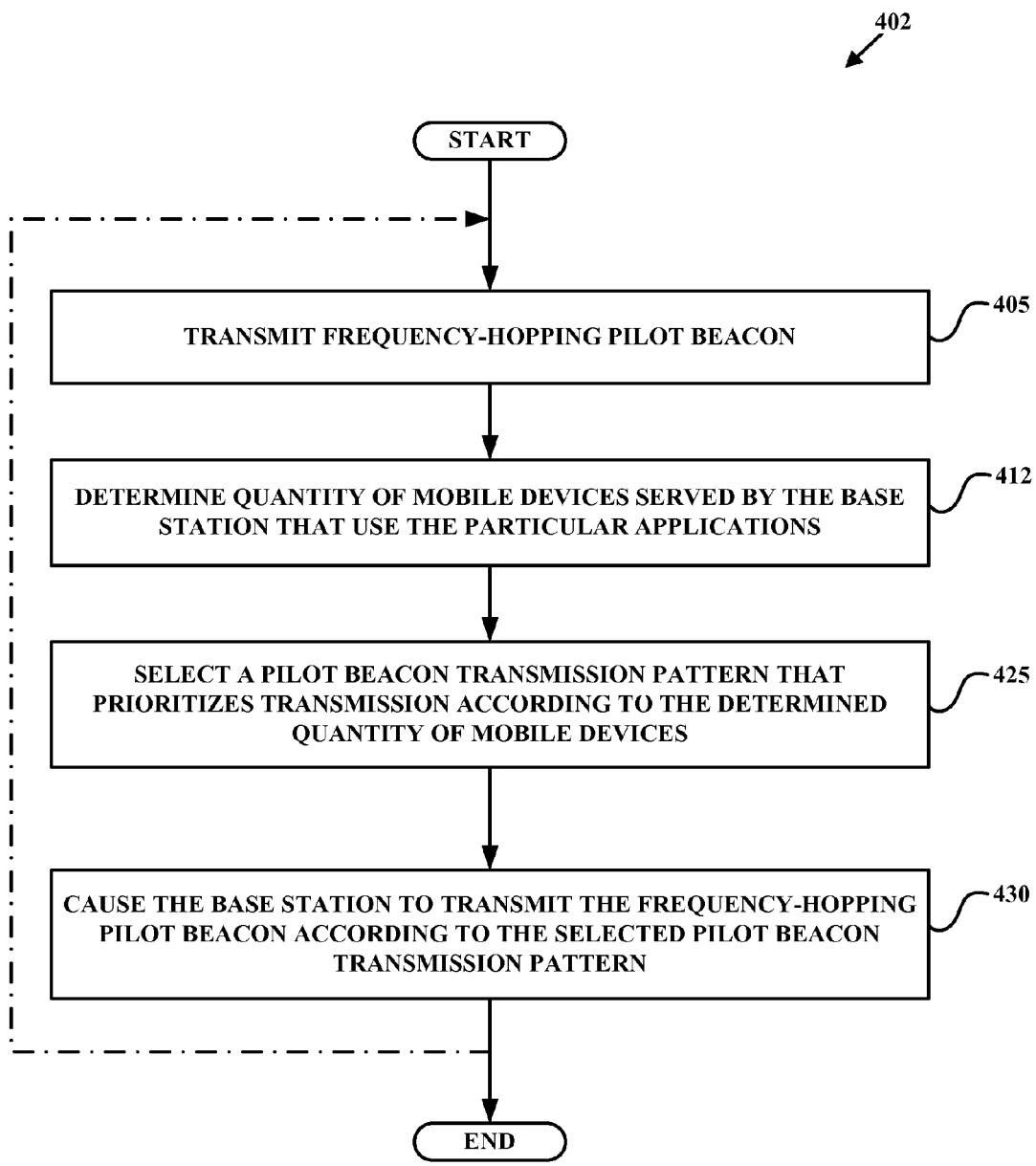
FIG. 4C depicts functions carried out in accordance with at least one embodiment.

FIG. 4C is a flowchart of another example process 402. In the process 402, the femtocell system (e.g., the femtocell 116 and/or SPN 110) operates according to blocks 405 and 412. After the quantity of mobile devices served by the femtocell 116 and using the particular applications is determined in block 412, the femtocell system selects, in block 425, a pilot beacon transmission pattern that prioritizes transmission on the frequencies according to the determined quantity of mobile devices. In block 430, the femtocell system then causes the femtocell 116 to transmit the frequency-hopping pilot beacon according the pattern selected in block 425.

In block 425, a pilot beacon transmission pattern may be selected that provides a transmission sequence specifying one or more of transmission frequency, duration, transmission power for the frequency-hopping pilot beacon. For example, the selected frequency hopping transmission pattern may specify an ordered sequence for a cycle of the frequency-hopping pilot beacon that specifies transmission parameters for each included frequency. The frequency hopping transmission pattern may specify transmission parameters that prioritize one or more of the frequencies relative to others. The one or more frequencies to prioritize may be determined according to the quantity of application usage determined in block 412. The one or more prioritized frequencies may be frequencies associated with the particular applications, and may be frequencies used to provide service to the mobile device 102 that is suitable for operating the particular applications.

A variety of possibilities exist for prioritizing frequencies, including any of those discussed in connection with block 415 above, and combinations thereof. For example, the selected frequency hopping transmission pattern may prioritize transmission by providing a combination of number of hops per cycle, cumulative and/or continuous transmission durations, and transmission power for one or more prioritized frequencies that results in the pilot beacon being more readily detectable at the one or more prioritized frequencies than at the other frequencies.

The frequency hopping transmission pattern selected in block 425 may be dynamically generated by the femtocell system (e.g., the femtocell 116 and/or SPN 110) according to application usage by mobile devices served by the femtocell 116 as determined in block 412. The various transmission parameters specified by the transmission pattern (e.g., power, duration, and the like) can be selected so as to assign desired degrees of prioritization to one or more of the frequencies, which can be determined on the basis of usage of applications associated with those frequencies as determined in block 412. As used herein, the degree of prioritization may refer, in general, to the likelihood of a mobile device in range of the femtocell 116 detecting the frequency-hopping pilot beacon on a particular frequency, which likelihood of detection is greater for more highly prioritized frequencies (due to transmissions being more often, for greater durations, and/or at higher power).

Alternatively, the transmission pattern selected in block 425 can be chosen from among a group of predetermined transmission patterns. For example, the femtocell system can store a group of predetermined transmission patterns which provide varying degrees of prioritization of the different frequencies relative to one another, which can be determined on the basis of usage of applications associated with those frequencies as determined in block 412.

In one such example, the femtocell system may select from transmission patterns based on the quantity of mobile devices using particular applications falling within particular ranges. In particular, the example Table 1 illustrates an example where EV-DO channels (represented as EVDO1 and EVDO2) are prioritized over 1xRTT channels (represented as 1xRTT1 and 1xRTT2) based on the quantity of mobile devices served by the femtocell 116 that use a low latency voice service, such as push to talk application or another application providing VOIP service.

TABLE 1 transmission patterns for specified quantities of mobile devices

| Quantity of mobile devices served by the femtocell using particular applications | Transmission pattern |
|---|---|
| >75% of mobile devices use a low latency voice service | Cycle 8 EVDO channels per 1xRTT channel:<br>EVDO1->EVDO2->EVDO1->EVDO2-><br>EVDO1->EVDO2->EVDO1->EVDO2-><br>1xRTT1->EVDO1->EVDO2->EVDO1-><br>EVDO2->EVDO1->EVDO2->EVDO1-><br>EVDO2->1xRTT2 |
| >50% of mobile devices use a low latency voice service | Cycle 4 EVDO channels per 1xRTT channel:<br>EVDO1->EVDO2->EVDO1->EVDO2-><br>1xRTT1->EVDO1->EVDO2->EVDO1-><br>EVDO2->1xRTT2 |
| <25% of mobile devices use low latency voice service >75% of calls placed through femtocell use 1xRTT | Even beacon cycle:<br>EVDO1->EVDO2->1xRTT1->1xRTT2-><br>EVDO2->EVDO1->1xRTT2->1xRTT1<br>Cycle 4 1xRTT channels per EVDO:<br>1xRTT1->1xRTT2->1xRTT1->1xRTT2-><br>EVDO1->1xRTT1->1xRTT2->1xRTT1-><br>1xRTT2->EVDO2 |

Table 1: Transmission Patterns for Specified Quantities of Mobile Devices

Table 1 provides one such example, although it will be apparent that the particular quantity ranges included in Table 1 are included for purposes of explanation and example only, and some embodiments may use other quantity ranges that are mapped to predetermined transmission patterns. Moreover, the example in Table 1 includes, by way of example only, transmission patterns which may prioritize EVDO channels relative to 1xRTT channels based on the quantity of served mobile devices using a low latency voice service. Although it will be apparent that other channels and other particular applications associated with such channels, such as channels for other wireless communication protocols and/or methodologies, may be prioritized by predetermined transmission patterns in a related manner 4. Alternatives In some examples, the transmission pattern of the frequency-hopping pilot beacon can be chosen based in part on characteristics of mobile devices served by the femtocell 116. In an example where particular mobile devices are registered with the femtocell 116 (e.g., users of the femtocell 116 included on a "white list"), a hopping pattern can be based in part on substantially unique identifiers associated with such particular mobile devices. For example, a hopping pattern can be deduced in part from a hashing algorithm applied to mobile directory numbers (MDNs) of such registered mobile devices. Embodiments using such a hashing algorithm may advantageously align subsequent hopping cycles on particular frequencies with frequencies favored by registered mobile devices, which may determine scanning frequencies for their slot cycles according to a similar hashing algorithm.

In some embodiments, the femtocell 116 may continue transmitting in the manner set forth above for an indeterminate amount of time. Alternatively, the femtocell 116 can intermittently re-determine the prioritization, and modify the transmission of the frequency-hopping pilot beacon accordingly, which is indicated by the dashed line in FIGS. 4A-4C. Therefore, processes 400-402 disclosed herein may include updating the prioritization of the frequency-hopping pilot beacon according to updated application usage information after an initial prioritization. The femtocell system may determine updated particular one(s) of the frequencies to prioritize in subsequent transmissions of the frequency-hopping pilot beacon based on the particular one(s) being associated with particular applications used by mobile devices served by the femtocell 116. Such updated prioritization can be determined according to updated application usage information. For example, the femtocell system may re-determine prioritization of the frequency-hopping pilot beacon before every pilot beacon transmission cycle. Other timings could also be used.

The processes 400-402 disclosed herein may be used to allow the femtocell 116 to dynamically adjust its hopping pattern according to current application usage of mobile devices served by the femtocell 116. The processes 400-402 may allow the femtocell 116 to preferentially attract mobile devices using particular applications, and thereby decrease the hand off lag time for such mobile devices to connect to the femtocell 116. When operating according to the processes 400-402, the femtocell 116 may thereby assist the SPN 110 in handling traffic for mobile devices using such applications, such as applications providing low latency VOIP service or other time sensitive applications.

In some embodiments discussed herein, the femtocell 116 can be a first base station that provides service to mobile devices on a first frequency (e.g., an RF carrier used by the femtocell 116 to communicate with the mobile device 102). Similarly, the transceiver stations of the SPN 110 (e.g., BTSs 104, BSCs 106, and/or eNBs) can be considered a group of second base stations that provide service to mobile device on a plurality of second frequencies (e.g., macro-network carriers used to communicate between the SPN 110 and mobile devices).

5. Conclusion

While some example embodiments have been described above, those of ordinary skill in the art will appreciate that numerous changes to the described embodiments could be made without departing from the scope and spirit of the claims.

What is claimed is:

1. A method of operating a wireless network system, wherein the wireless network system includes a first base station operating on a first base station frequency to serve mobile devices, and one or more second base stations operating on a plurality of second base station frequencies, the method comprising:
   transmitting a frequency hopping pilot beacon among the plurality of second base station frequencies;
   determining that one or more mobile devices served by the first base station use one or more particular applications;
   identifying one or more of the second base station frequencies based on the identified one or more second base station frequencies being associated with the one or more particular applications used by the one or more mobile devices;
   selecting a pilot beacon transmission pattern that prioritizes transmission on the identified one or more of the second base station frequencies as compared to others of the plurality of second base station frequencies, wherein the selected pilot beacon transmission pattern defines a sequence of hopping among the second base station frequencies such that, during a transmission cycle in which the frequency hopping pilot beacon is transmitted on each of the plurality of second base station frequencies, the first base station transmits on the identified one or more of the second base station frequencies for a greater cumulative duration than a cumulative duration in which the first base station transmits on the others of the plurality of second base station frequencies; and
   causing the first base station to transmit the frequency hopping pilot beacon according to the selected pilot beacon transmission pattern.

2. The method of claim 1, wherein transmitting the frequency hopping pilot beacon includes repeatedly cycling through transmitting on each of the plurality of second base station frequencies, and
   wherein the selected pilot beacon transmission pattern specifies that, during at least one of the repeated cycles of the frequency hopping pilot beacon, the identified one or more of the second base station frequencies is transmitted for a greater cumulative duration than a cumulative duration in which the frequency hopping pilot beacon is transmitted on the others of the plurality of second base station frequencies.

3. The method of claim 1, wherein transmitting the frequency hopping pilot beacon includes repeatedly cycling through transmitting on each of the plurality of second base station frequencies, and
   wherein the selected pilot beacon transmission pattern specifies that, during at least one of the repeated cycles of the frequency hopping pilot beacon, the identified one or more of the second base station frequencies is transmitted with a greater transmission power than a transmission power with which the frequency hopping pilot beacon is transmitted on the others of the plurality of second base station frequencies.

4. The method of claim 1, wherein transmitting the frequency hopping pilot beacon includes repeatedly cycling through transmitting on each of the plurality of second base station frequencies, and
   wherein the selected pilot beacon transmission pattern specifies that, during at least one of the repeated cycles of the frequency hopping pilot beacon, the frequency hopping pilot beacon is transmitted more often on the identified one or more of the second base station frequencies than the frequency hopping pilot beacon is transmitted on the others of the plurality of second base station frequencies.

5. The method according to claim 1, further comprising:
   determining a quantity of mobile devices, served by the first base station, that use the one or more particular applications; and
   determining that the determined quantity exceeds a threshold, and
   wherein causing the first base station to transmit the frequency hopping pilot beacon according to the selected pilot beacon transmission pattern is responsive to determining that the determined quantity exceeds the threshold.

6. The method of claim 1, further comprising:
   determining a quantity of mobile devices, served by the first base station, that use the one or more particular applications; and
   wherein selecting the pilot beacon transmission pattern includes selecting, based on the determined quantity of mobile devices, one of a set of pilot beacon transmission patterns that is associated with the determined quantity of mobile devices;
   wherein each of the set of pilot beacon transmission patterns specify a sequence of hopping among the second base station frequencies that define a level of prioritization of the identified one or more of the second base state frequencies relative to the others of the second base state frequencies.

7. The method according to claim 1, wherein the one or more particular applications include a low latency inter-mobile-device voice service.

8. A wireless network system comprising:
   a first base station including (i) an internet interface, and (ii) one or more antenna structures; and
   a controller, and
   wherein the internet interface is configured to communicate with a network, wherein the one or more antenna structures are configured to (i) transmit a frequency hopping pilot beacon on a plurality of second base station frequency, and (ii) wirelessly communicate, on a first base station frequency, with mobile devices served by the first base station to thereby link the mobile devices served by the first base station to the network via the internet interface, and wherein the controller is configured to (i) determine that one or more mobile devices served by the first base station use one or more particular applications, (ii) identify one or more of the plurality of second base station frequencies based on the identified one or more second base station frequencies being associated with the one or more particular applications used by the one or more mobile devices, (iii) select a pilot beacon transmission pattern that prioritizes transmission on the identified one or more of the second base station frequencies as compared to others of the second base station frequencies, and (iv) cause the first base station to transmit the frequency hopping pilot beacon according to the selected pilot beacon transmission pattern, wherein the selected pilot beacon transmission pattern defines a sequence of hopping among the second base station frequencies such that, during a transmission cycle in which the frequency hopping pilot beacon is transmitted on each of the plurality of second base station frequencies, the first base station transmits, on the identified one or more of the second base station frequencies, for a greater cumulative duration than a cumulative duration in which the first base station transmits on the others of the second base station frequencies.

9. The wireless network system of claim 8,
wherein the controller is included in the first base station, and
wherein the one or more particular applications include a low latency inter-mobile-device voice service.

10. The wireless network system of claim 8,
wherein the first base station is configured to transmit the frequency hopping pilot beacon via the one or more antenna structures by repeatedly cycling through transmitting on each of the plurality of second base station frequencies, and
wherein the selected pilot beacon transmission pattern specifies that, during at least one of the repeated cycles of the frequency hopping pilot beacon, the identified one or more of the second base station frequencies is transmitted for a greater cumulative duration than a cumulative duration in which the frequency hopping pilot beacon is transmitted on the others of the second base station frequencies.

11. The wireless network system of claim 8,
wherein the first base station is configured to transmit the frequency hopping pilot beacon via the one or more antenna structures by repeatedly cycling through transmitting on each of the plurality of second base station frequencies, and
wherein the selected pilot beacon transmission pattern specifies that, during at least one of the repeated cycles of the frequency hopping pilot beacon, the identified one or more of the second base station frequencies is transmitted with a greater transmission power than a transmission power with which the frequency hopping pilot beacon is transmitted on the others of the second base station frequencies.

12. The wireless network system of claim 8,
wherein the first base station is configured to transmit the frequency hopping pilot beacon via the one or more antenna structures by repeatedly cycling through transmitting on each of the plurality of second base station frequencies, and
wherein the selected pilot beacon transmission pattern specifies that, during at least one of the repeated cycles of the frequency hopping pilot beacon, the frequency hopping pilot beacon is transmitted more often on the identified one or more of the second base station frequencies than the frequency hopping pilot beacon is transmitted on the others of the second base station frequencies.

13. The wireless network system of claim 8,
wherein the controller is further configured to determine (i) a quantity of mobile devices, served by the first base station, that use the one or more particular applications, and (ii) determine that the determined quantity exceeds a threshold, and
wherein the controller is configured to cause the first base station to transmit the frequency hopping pilot beacon according to the selected pilot beacon transmission pattern responsive to determining that the determined quantity exceeds the threshold.

14. A method of operating a wireless network system, wherein the wireless network system includes a first base station operating on a first base station frequency to serve mobile devices, and one or more second base stations operating on a plurality of second base station frequencies, the method comprising:
transmitting a frequency hopping pilot beacon among the plurality of second base station frequencies;
determining a quantity of mobile devices that are served by the first base station and that use one or more particular applications, wherein one or more of the second base station frequencies are associated with the one or more particular applications;
identifying one of a plurality of threshold levels based on the determined quantity and based on the identified one of the threshold levels corresponding to the determined quantity;
selecting one of a set of pilot beacon transmission patterns based on the selected one of the pilot beacon transmission patterns being associated with the identified one of the threshold levels, wherein each of the set of pilot beacon transmission patterns specify a sequence of hopping among the second base station frequencies that define a level of prioritization of the one or more of the second base state frequencies relative to others of the second base state frequencies; and
causing the first base station to transmit the frequency hopping pilot beacon according to the selected pilot beacon transmission pattern.

\* \* \* \* \*